W. THOMAS.
PROCESS OF DISTILLING CARBONACEOUS MATERIAL.
APPLICATION FILED JUNE 8, 1916.
1,422,496.
Patented July 11, 1922.
4 SHEETS—SHEET 1.
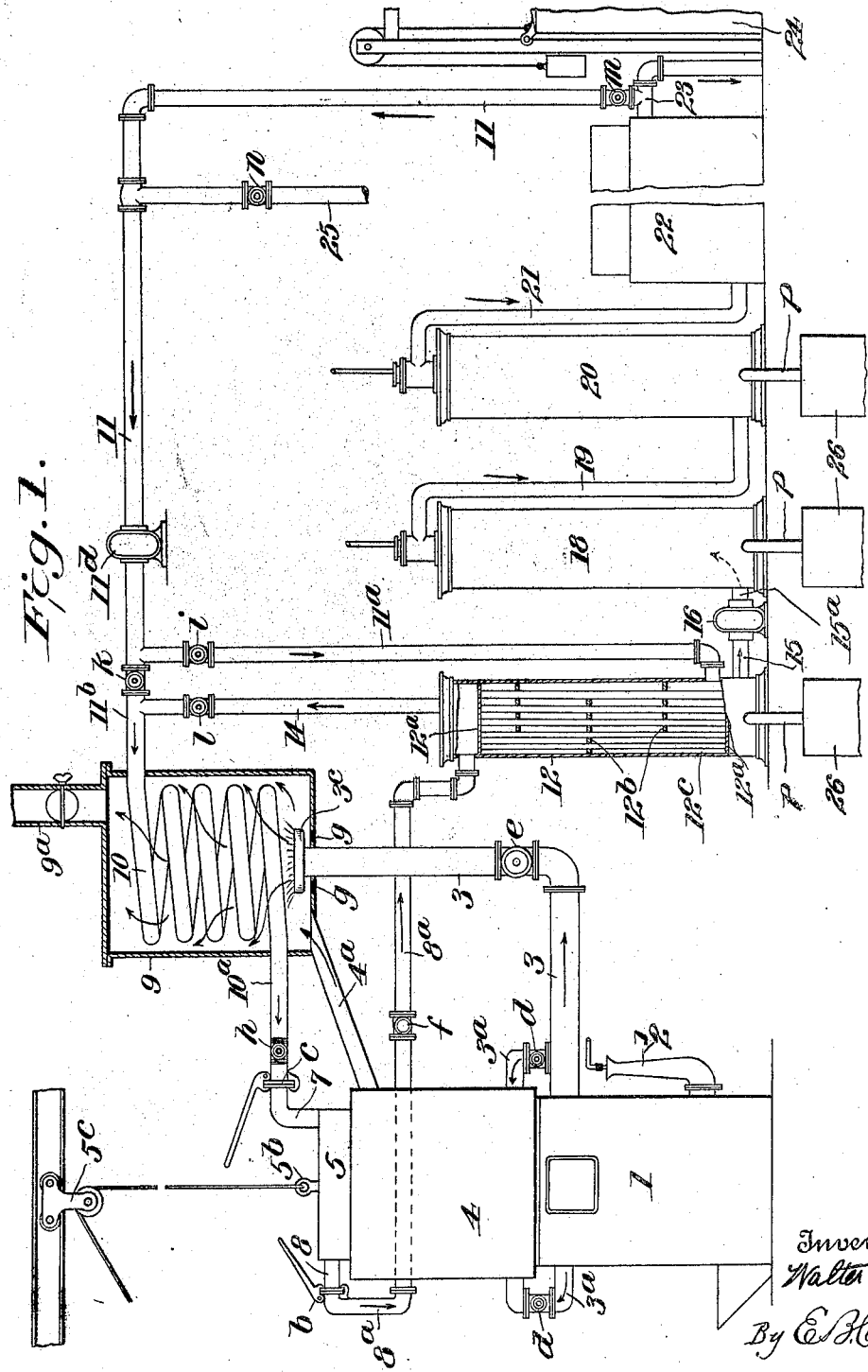

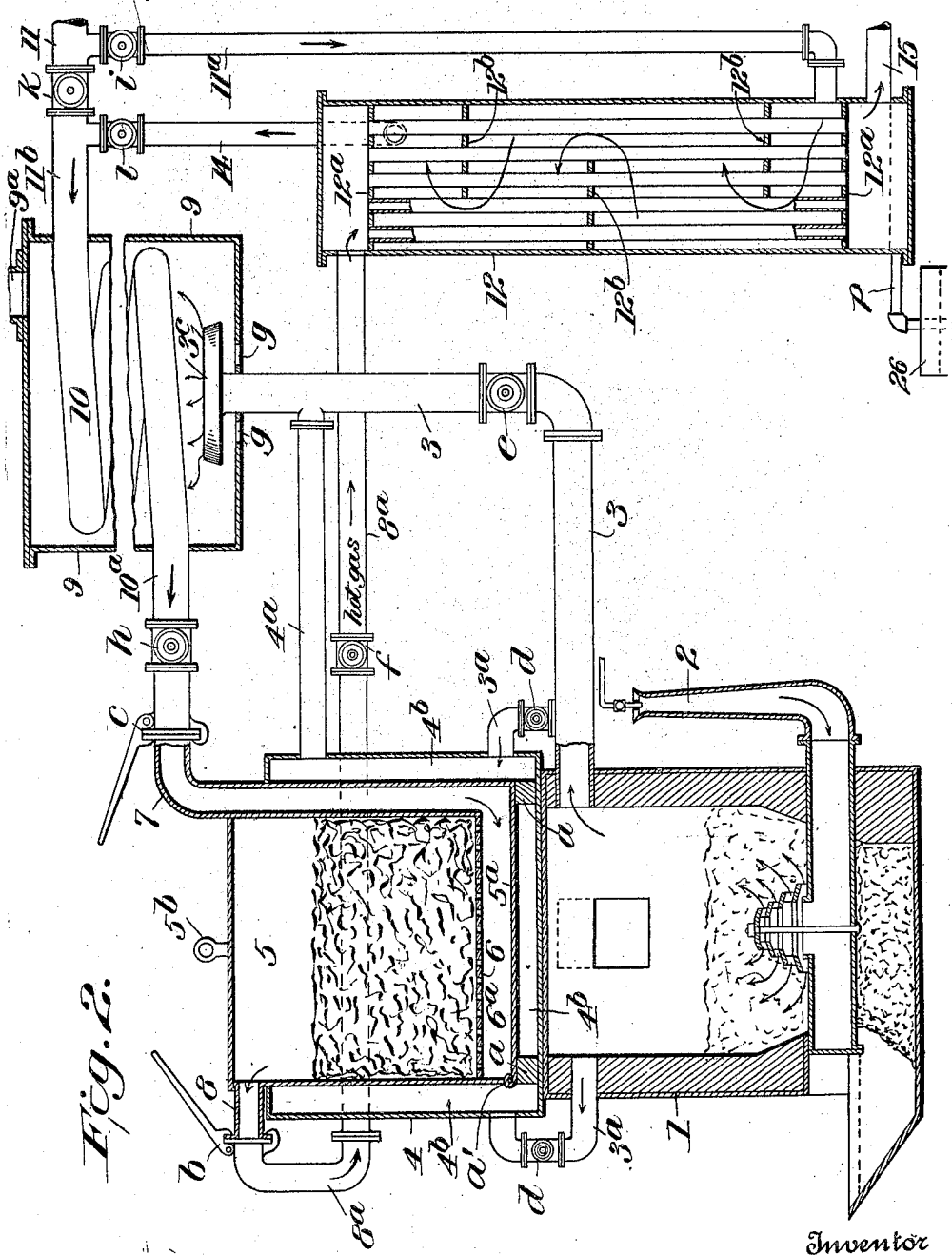

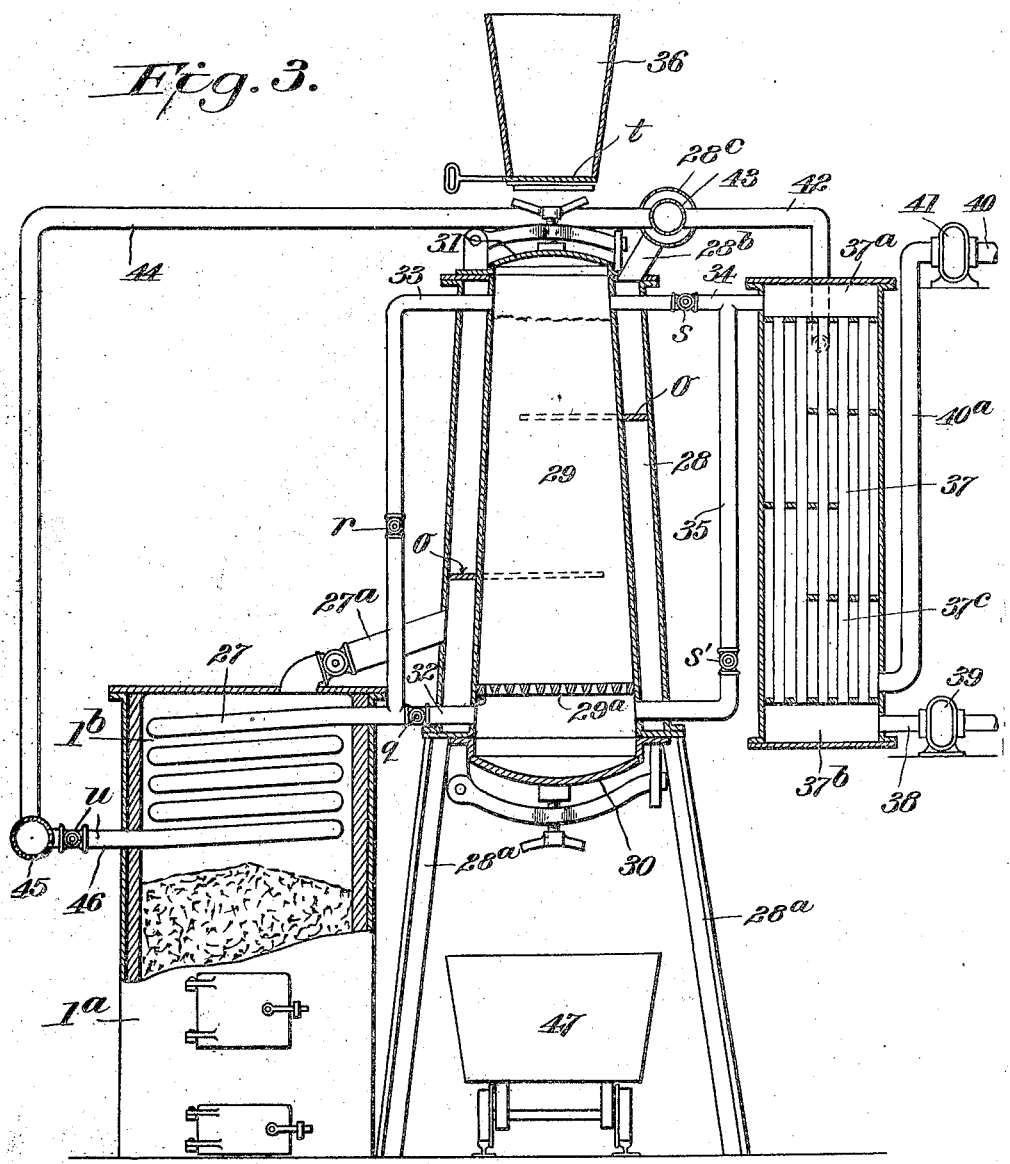

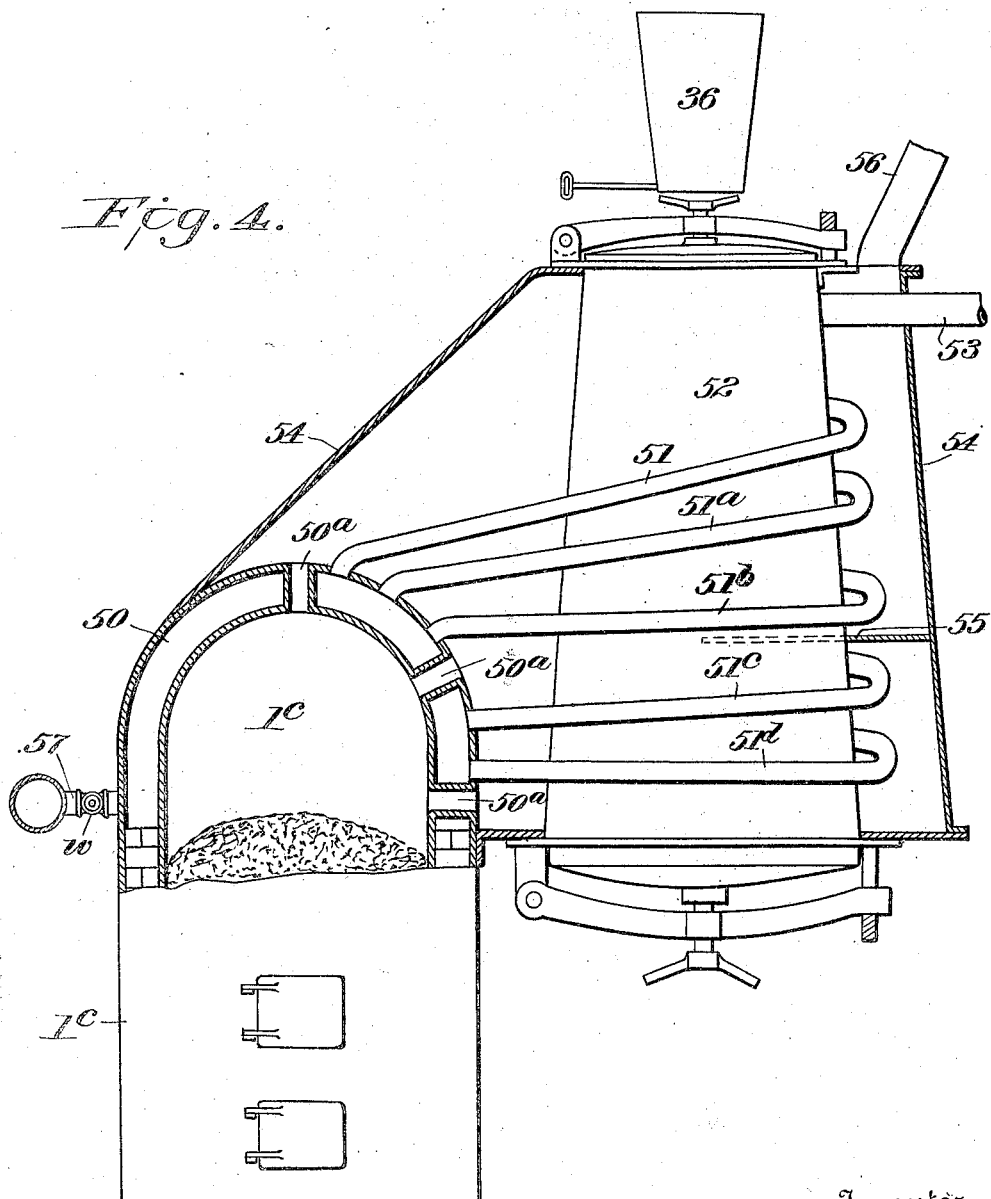

UNITED STATES PATENT OFFICE.

WALTER THOMAS, OF NANAIMO, BRITISH COLUMBIA, CANADA.

PROCESS FOR DISTILLING CARBONACEOUS MATERIAL.

1,422,496.  Specification of Letters Patent.  Patented July 11, 1922.

Application filed June 8, 1916. Serial No. 102,552.

*To all whom it may concern:*

Be it known that I, WALTER THOMAS, a subject of the King of Great Britain, residing at Nanaimo, Province of British Columbia, Canada, have invented certain new and useful Improvements in Processes of Distilling Carbonaceous Material, of which the following is a specification.

This invention relates to the distillation of coal, wood, peat or lignite, by the direct application of internal heat for the production of smokeless fuel and the recovery of valuable by-product liquids used in the manufacture of high explosives, dyes and disinfectants.

The principal object of my invention is to provide for the more rapid and economical distillation of coal and other material containing volatile hydrocarbon matter by direct internal application of hot gas at a constantly controlled temperature, and distributed in contact with the material, for more rapidly taking up and carrying off volatile matter, such as benzene, toluol and other liquid products containing creosote or carbolic acid, and the like.

Another object of this invention is to provide for the rapid and economical production of pure and valuable liquid and solid products by the internal distillation of coal, peat, lignite and wood—that is, distillation effected by application of hot purified coal gas, at a perfectly controlled temperature in direct contact with the material under treatment, for the purpose of greatly expediting the operation and producing smokeless fuel, free from sulphur and sulphur compounds, and purer, higher grade liquid products.

Another object is to provide for rapidly liberating gas and vapor from coal, wood and other materials containing a large per cent of volatile products, condensing and collecting the hydrocarbon, such as benzene, toluol and creosote liquids, washing, scrubbing and purifying the gas to remove ammonia and sulphur compounds, and then returning the cool purified gas and using it, first for cooling the hot distilled gaseous products, causing condensation of volatile products into pure liquids, and then further heating such gas to the desired temperature by means of cheap producer-gas and then distributing it uniformly at a controlled and uniform temperature through and in direct contact with a body of coal or wood undergoing distillation, and to which external heat may at the same time be applied.

In carrying out my process hot, purified coal-gas, at a controlled temperature, will be passed into intimate contact with every particle or molecule of coal and rapidly pick up the volatile matter at a comparatively moderate temperature, between 600° and 1000° F. Practically all of the matter volatile at that temperature will be carried off with the currents of hot gas and practically none of such matter, or any tarry matter will be baked into hard carbon or crusts on the walls of the retort or distilling chamber. The yield of benzene and toluol in pure condition, useful in making coal tar dyes, will be increased; also the yield of creosote oil or carbolic acid, used in making high explosives, will be greatly increased, and a high grade smokeless fuel, practically free from sulphur and its compounds, will be produced.

Owing to the fact that in my process direct internal distillation is effected by contact of hot purified coal gas at a constantly maintained and controlled temperature there will be no injurious and objectionable reactions in the distillation and production of pure and uniform qualities of liquid distillate products, as is the case when coal is distilled in retorts or ovens which are subjected to excessive and irregular heats in an effort to force the heat to penetrate several inches of fire clay walls and a thick body of quiescent fuel. In my process the operation is rapid, though the temperature is comparatively low, for the reason that the heat is applied directly and intimately to every particle or molecule of coal and the distillate products are immediately carried along and out of the distilling chamber by the currents of hot gas. No opportunity is allowed for objectionable reactions in the distillate and no chance of burning and formation of thick tar or hard carbon is permitted.

The apparatus being of simple construction and small first cost is well adapted to be installed and operated in small works—in detached institutions—such as schools, colleges, hotels, asylums, hospitals and other buildings where there is a demand for pure coal gas, free from carbon monoxide, and for pure smokeless coal. In these works, providing a supply of gas is available and the appartus cold, the operation of distilling coal and generating gas may be started in fifteen minutes owing to the fact that hot gas is brought into direct contact with the particles of coal throughout the whole body under treatment; and in sixty minutes the maximum production per retort may be effected. The engineer is thus enabled to make the required quantity of gas in a few hours and then shut down for a period of twenty to twenty four hours. This can be done owing to the fact that the operation is rapid and can be carried out at a comparatively low temperature, usually not above 1200° F. and mostly at a lower temperature of about 900° F.

Other objects and purposes of my improved process will appear in the detailed description.

Simple constructions and arrangements of apparatus, in modified constructions and somewhat diagrammatic in form, adapted for carrying out my process, are illustrated in the accompanying drawings, in which—

Figure 1 represents an elevation partly in section, showing one form of the whole apparatus.

Fig. 2 represents, on enlarged scale, a sectional elevation of part of the apparatus.

Fig. 3 represents an elevation, partly in section, showing a modified construction and arrangement of apparatus.

Fig. 4 represents a sectional elevation of another modified construction of distilling chamber or retort and connections.

I will first describe my process by reference to Figs. 1 and 2 of the drawing.

In carrying out my invention I preferably provide a gas producer 1 of any well known kind to which a blast of air is supplied by a steam jet blower 2, and from which producer-gas is conducted off by a main pipe 3 to a heating chamber 9. Above, and, if desired, upon the gas producer is mounted a heating jacket or chamber 4, which may be constructed of brick or protected by non-conducting coating or lining in a well known manner. Within this chamber is placed a removable coal distilling retort or chamber 5, provided with a hinged bottom or door $5^a$, and at the top with eye $5^b$ for attaching a rope or chain which passes over a trolley $5^c$ on an overhead rail. The retort will rest upon blocks $a$ and is provided with a perforated bottom plate or grate 6, providing below it a gas distributing chamber $6^a$, with which connects a gas inlet pipe 7. A gas and vapor outlet pipe 8 connects with the top of retort 5.

Circumferential and bottom flues $4^b$ are provided in the jacket for circulating hot gas around the retort. Gas inlet pipes $3^a$, having valves $d$, lead from the gas producer into the flues $4^b$, and an escape pipe $4^a$ leads either directly from the jacket to the chamber 9 as in Fig. 1, or to the gas pipe 3, as in Fig. 2.

The hot gas inlet-pipe 7, to the retort is connected to the hot gas pipe $10^a$ by a quick-acting coupler device $c$, and the gas outlet pipe 8 is connected by a similar coupler $b$ with the gas take-off pipe $8^a$ leading to the first double surface cooler and condenser 12.

The main outlet pipe 3, having a valve $e$, leads from the producer into a heating chamber 9, and terminates in any kind of suitable burner $3^c$. Below this burner are provided air inlet ports $g$. It must be understood that the heating chamber 9, burner and air inlets are shown only diagrammatically, and will, in practice, be constructed in a well known effective manner for best conserving and utilizing the heat of combustion. The chamber 9 is provided with a stack pipe $9^a$ having a damper. In chamber 9 is located a gas heating coil 10, having a lower outlet pipe $10^a$, provided with a valve $h$, and connected to the retort inlet pipe 7 by a coupler $c$. An inlet pipe $11^b$, which may be an extension of the main gas supply pipe 11, connects with the top of coil 10. Warm or hot gas is supplied to the coil as will now be explained. Cold gas from the holder or the outlet of the purifier 22 is heated in the first cooler and condenser 12 by the outgoing hot gas. This condenser cools hot gas from the retort by means of cold gas from the holder. This is a tubular double surface condenser of known construction and has top and bottom tube sheets $12^a$, providing upper and lower gas chambers, the sheets being connected by tubes in the larger intermediate chamber $12^c$, which is provided with transverse baffle plates $12^b$, making a circuitous passage for gas to be heated. The outlet pipe $8^a$ from the distilling retort connects with the upper gas chamber of the condenser and an outlet pipe 15 connects the lower gas chamber with a positive rotary exhauster 16, Fig. 1, of a well known kind, which discharges by pipe $15^a$ into the base of the second cooler and condenser 18. A pipe 19 connects the top of cooler 18 with the bottom of cooler 20, and a pipe 21 connects the top of the latter with the usual purifier 22. An outlet pipe 23 leads from purifier 22 into a holder 24. With pipe 23 connects a return pipe 11 having a valve $m$, and serving as the main cold gas supply pipe. In the return pipe 11 I preferably connect a positive gas forcing pump $11^d$ for increasing the pressure of gas supplied to the coal distilling retort, so that the hot gas may be caused to quickly permeate the body of coal and quickly carry off the products of distillation. A branch pipe $11^a$, having a valve $i$, leads from pipe 11 to the lower end of the intermediate gas chamber $12^c$, and a pipe 14, having a valve $l$, connects the top of said chamber with the inlet pipe $11^b$ of the heating coil 10. A valve $k$ is placed in the pipe section between the connections of pipes $11^a$ and 14 with pipe 11—11<sup>b</sup>, so that cold gas may be passed to the condenser 12 or directly to the heater coil 10. A pipe 25, having a valve n, connects with pipe 11 and may be used for supplying natural gas or gas from a separate holder to be heated and passed into the coal distilling retort. The condensers or coolers 18 and 20 may be washer-scrubbers of well-known construction. With the bottom of each cooler or condenser there is connected by pipe p a tar or liquid trap 26 of a known variety for receiving the condensed liquid products.

In practice gate valves may be used on the larger pipes. The supply pipes may be arranged partially underground, or in any convenient manner, and many modifications may be made in the construction and arrangement of the apparatus. Although I prefer a movable and dumping coal distilling retort for some purposes, yet a stationary retort or chamber, as shown in Figs. 3 and 4, may be used, and would be preferable in some plants. Evidently any desired number of distilling retorts may be arranged in series, in a line, so that all may be conveniently handled by a traveling trolley. The gas-producer may be made large enough to supply gas for heating many coils or chambers 9, and numerous chambers containing coal distilling retorts, in either of the modified forms of apparatus shown.

The modified form of apparatus shown in Fig. 3 is constructed and arranged as follows: The gas producer 1$^a$ may be of a well known kind, except that it has an upper extension 1$^b$, to serve as a heating chamber for a pipe coil 27, supplying hot gas to the distilling retort. A pipe 27$^a$, having a valve, connects the upper part of the producer with the retort chamber 28, which is preferably elevated above the producer and supported on standards 28$^a$. The retort 29 is preferably made of tapering form from below upward and set vertically and supported in its chamber in a well known manner. Baffle plates o are secured in the opposite walls of chamber 28 for causing hot products to circulate around the retort. An escape flue 28$^b$ connects the upper end of chamber 28 with a horizontal chimney flue 28$^c$, which may extend along a line or series of retorts and serve for heating a gas supply main 43. In the lower end of the retort is preferably placed a hinged grate 29$^a$, providing a gas chamber below it. The lower end is closed by a hinged or other cover 30 and the upper end by a cover 31.

In this modification I provide for supplying hot gas for internal distillation alternately at bottom and top of the retort and at intervals reversing the current, through the body of coal being distilled. One branch pipe 32, having a valve q, connects coil 27 with the bottom of the retort, and another branch 33, having a valve r, connects the coil with the top of the retort. A gas outlet pipe 34, having a valve s, connects the top of the retort with the upper gas chamber 37$^a$ of a surface condenser, and another outlet pipe 35, having a valve s', connects the lower gas chamber of the retort with pipe 34, so that gas may be passed either from the top or bottom of the retort to the condenser. A coal measuring hopper 36, having a bottom slide t, is preferably mounted above the retort as shown.

The surface condenser 37 may be of the same construction as that shown at 12 in Fig. 2, being provided with upper and lower gas chambers 37$^a$ and 37$^b$, and an intermediate tube chamber 37$^c$. A gas outlet pipe 38 connects with chamber 37$^b$ and with a rotary exhauster 39, which may connect with other condensers or scrubbers, a purifier and a holder, as shown in Fig. 1. A rotary pressure blower 41 is connected with the gas supply pipe 40 and the delivery pipe 40$^a$, connected with the tube chamber 37$^c$, where the cold gas is heated by circulating in contact with the tubes conveying hot gas from the distilling retort, as previously described. The gas heated in chamber 37$^c$ will be passed out by pipe 42 into a main 43 in a hot flue 28$^b$ and will be passed therefrom by pipe 44 into a main 45 extending along the series of retorts. A pipe 46, having a valve u, connects main 45 with the heating coil 27 in chamber 1$^b$ of the producer.

A car 47 for smokeless coal or charcoal is run on rails below the series of retorts and any desired number will be used for receiving coal or charcoal as discharged from the retorts.

This form of apparatus is compact, economical and convenient for small works, and adapted for carrying out the process in a rapid and economical manner.

In order to equalize the temperature and make the distilling operation more uniform and complete throughout the whole body of coal or wood in the distilling retort, from the beginning to the end of the run, I find in practical operation that the construction and arrangement of apparatus shown in Fig. 4 gives the most satisfactory results. The producer 1$^c$ is constructed with a dome shaped double wall gas heating chamber 50, having any desired number of outlet ports 50$^a$ through it for passing hot producer-gas into the retort chamber 54. The vertical retort 52 is set and supported in its heating chamber 54 in a known manner, and the latter is supported on standards. The retort is closed by upper and lower removable covers. Hot gas is passed at a number of heights or levels into the body of distilling coal or wood by means of any desired number of pipes leading from chamber 50. In the drawing I have shown five pipes, 51, 51ª, 51ᵇ, 51ᶜ, and 51ᵈ, connecting with the dome chamber 50 and passing through the heating chamber 54, partially around the retort and connecting with the same at different heights as shown in the drawing. A gas outlet pipe 53 leads from the upper end of the retort and will connect with a condenser as shown in Fig. 3. Any desired number of baffle plates 55 may be arranged in the retort heating chamber 54 for holding hot products longer in contact with the retort. An escape flue 56 for waste products connects with the upper part of chamber 54. An inlet pipe 57, having a valve $w$, for cold gas connects with the dome chamber 50.

In connection with this modified construction of producer and distilling retort I may use the condensers, a purifier and gas holder and connections similar to those shown in Fig. 1.

The operation is very simple, and in the apparatus shown in Figs. 1 and 2 may be conducted as follows:—

The gas producer 1 being fired and generating gas, the chamber 4 will be heated by hot gas admitted through pipe 3ª and circulated in the flues 4ᵇ. Producer gas will be supplied to the burner 3ᶜ and burned, thereby heating chamber 9 and the coil 10. The retort 5 will be filled with fresh fuel, as bituminous coal, and lowered into the chamber 4, and then coupled at $b$ and $c$ to the inlet and outlet pipes 10ª and 8ª. Gas will now be forced by the pressure blower 11ᵈ into coil 10 and heated to a temperature between 600° and 1000° F., or higher, and passed into chamber 6ª and distributed therefrom in numerous streams through the grate or perforated plate 6 up through the body of coal, where it will permeate the mass in contact with every particle of coal, causing rapid and uniform liberation of hydrocarbon vapors and gases throughout the whole body of coal. The action will be rapid and uniform, and high grade vapor products will be taken up and carried by the currents of gas. The operation will also be accelerated by the exhauster 16, which will draw the hot gas and vapor products down through the tubes in chamber 12. At the same time cold gas, admitted by pipes, 11ª will be caused to pass around the tubes, back and forth, by the baffle plates, and become heated while cooling the gas flowing down through the tubes. The condensable products will be condensed and flow off through the seal box 26 and the gas will flow into the second cooler 18, where the hydrocarbon products will be further condensed and collected. The gas will then be further cooled by passage through the cooler and scrubber 20, and will pass thence through the purifier 22 for the final removal of sulphur, sulphur compounds and carbonic acid. The purified gas will thence pass to the holder 24. Any desired per cent of the cold gas will be passed off by pipe 11, 11ª to the chamber 12 for continuing the operation of cooling the gas from the retort and being thereby heated before flowing into the heating coil 10.

In the modified form of apparatus shown in Fig. 3 distillation of coal or wood is effected by both internal heat imparted by direct contact of hot gas, and by external heat of producer-gas in chamber 28 around the retort. The gas-producer being in operation hot products will pass into chamber 28, and coal gas or wood gas will be heated in coil 27 at a constantly maintained and uniform temperature and may be first passed up through the body of coal or wood in the retort. For this purpose the valves $r$ and $s'$ will be closed and the valves $q$ and $s'$ will be opened, permitting hot gas to pass into the bottom of the retort, and thence up through the body of coal or wood, and carry distillate products off through pipe 34 to the surface condenser 37. After the desired period the direction of the current of hot gas may be reversed by opening valves $r$ and $s'$ and closing valves $q$ and $s$, so that hot gas will pass down through the charge and distillate products will be passed off by pipes 35 and 34 to the condenser. The distilling operation can thus be expedited by reason of heating the charge more uniformly at both ends. The cold gas will be supplied under pressure by the rotary force pump 41 and will be heated in the condenser 37, in the main 43 and finally in the coil 27. Since high temperatures are not used in my process the amount of heat required is surprisingly small for securing the desired results.

In carrying out my process in the modified form of apparatus shown in Fig. 4 the hot coal gas or wood gas, heated in the dome chamber 50, will be discharged by the pipes 51 to 51ᵈ at different heights into the body of coal or wood in the retort 52 and will rapidly and uniformly effect distillation, and practically at the same time throughout the whole charge, instead of first heating and distilling the bottom part and causing it to be overheated while waiting for distillation to be completed in the top portion of the charge. In the operation of this apparatus according to my process I have obtained superior results, having obtained 186 gallons of liquid distillate products, including about 160 gallons of high grade tar from one cord of fir roots. The distillate is of lighter color and is clearer and brighter than that obtained by the ordinary process of distillation.

Though I have mentioned above a temperature of 600° to 1000° F., I wish it understood that my process is not limited to a temperature within such limits, and I may maintain in the coal distilling chamber a temperature up to approximately 1200°. For this purpose the gas may be heated to a temperature between 800° and 1500° F., as, owing to its expansion in the distilling chamber and the rapid outflow of hot gases and vapors, the temperature therein will be lower than that of the inflowing hot gas. As a rule, however, it will be preferable not to heat the coal-gas above a temperature of 600° to 800° F. in order that the carburetted hydrogen present may not be destructively decomposed and the carbon deposited as lamp-black or hard carbon, entailing a loss of illuminants. A high temperature gas for internal distillation is not required in my process, since the distilling chamber is partially heated by external heat carried by hot producer gas, or produced by the combustion of such gas. The heat of the distilling chamber is thus maintained notwithstanding the constant outflow of hot gas and vapor. This double heating forms a valuable and important part of my process. Rapid and economical distillation can be thus effected at a comparatively low temperature without injury to the gas or the liquid distillate products, and a valuable smokeless coal will be produced.

An important economic effect, in my process, is produced by returning and using cold purified gas to cool the freshly generated outflowing hot gas and vapor in the double surface condenser 12, Fig. 2. The return gas is thereby heated by the outgoing gas which it is desired to cool for causing condensation of the volatile matter carried thereby, so as to obtain toluol, benzole and other valuable liquid products. The return gas thus heated, and further heated is passed into the body of distilling coal and the heat thus effectively utilized. The heated purified return gas, mostly freed from sulphur, serves for better taking up sulphur and its compounds from the coal under treatment, so as to produce a better, desulphurized fuel.

Having described my invention, what I claim, and desire to secure by Letters Patent, is—

1. The process of distilling fuel material containing sulphur in a vertical retort and obtaining pure liquid distillate products and desulphurized smokeless fuel, which consists in heating purified gas to the required temperature and forcing it alternately at different points one above the other, into a body of material for more quickly and uniformly effecting distillation of the whole body by direct internal heat, and carrying off the resulting volatile products by such gas and condensing the products to obtain pure distillate liquids.

2. The process of distilling carbonaceous material which consists in confining it in a closed retort, heating the retort, purifying gas, heating the purified gas and passing the heated gas through the material contained in the retort alternately from top to bottom and from bottom to top.

In testimony whereof I affix my signature in presence of two witnesses.

WALTER THOMAS.

Witnesses:
L. M. GRANT,
A. E. PLANTA.